United States Patent
Ling et al.

(10) Patent No.: US 11,673,831 B2
(45) Date of Patent: Jun. 13, 2023

(54) METHOD FOR PREPARING OPTICAL FIBERS WITH HIGH-PARTICLE-COATED POROUS POLYMERIC OUTER COATING LAYERS

(71) Applicant: The Hong Kong University of Science and Technology, Hong Kong (CN)

(72) Inventors: Li Ling, Hong Kong (CN); Zihang Cheng, Hong Kong (CN); Chii Shang, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 320 days.

(21) Appl. No.: 17/020,446

(22) Filed: Sep. 14, 2020

(65) Prior Publication Data

US 2021/0094874 A1     Apr. 1, 2021

Related U.S. Application Data

(60) Provisional application No. 62/973,354, filed on Oct. 1, 2019.

(51) Int. Cl.
| | |
|---|---|
| *C03C 25/1065* | (2018.01) |
| *C03C 25/26* | (2018.01) |
| *C03C 17/02* | (2006.01) |

(52) U.S. Cl.
CPC .......... *C03C 25/1065* (2013.01); *C03C 17/02* (2013.01); *C03C 25/26* (2013.01)

(58) Field of Classification Search
CPC ..... C03C 25/1065; C03C 17/02; C03C 25/26; C03C 25/109; C03C 25/16; C03C 25/47;
(Continued)

(56) References Cited

U.S. PATENT DOCUMENTS 5,252,494 A * 10/1993 Walt ................ G01N 33/582
436/805
5,637,507 A * 6/1997 Wicks ................ C03C 1/008
436/805
(Continued)

FOREIGN PATENT DOCUMENTS

| CN | 104006901 A | 8/2014 |
| CN | 105115939 A | 12/2015 |
| JP | 2004-168616 A | 6/2004 |

OTHER PUBLICATIONS

Baba, K. et al., "Photocatalytic Anatase $TiO_2$ Thin Films on Polymer Optical Fiber Using Atmospheric-Pressure Plasma", ACS Applied Materials & Interfaces, 2017, 9:13733-13741, American Chemical Society.

(Continued)

*Primary Examiner* — Ellen E Kim
(74) *Attorney, Agent, or Firm* — Saliwanchik, Lloyd & Eisenschenk

(57) ABSTRACT

A method for preparing optical fibers formed with high-particle-coated porous polymeric outer coating layer is provided. The method includes preparing a coating suspension solution by dispersing a plurality of particles into an organic solvent system, immersing one or more optical fibers into the coating suspension solution, removing the one or more optical fibers from the coating suspension solution to form high-particle-coated porous polymeric outer coating layer after drying. Concentrations and compositions of the particles in the coating suspension solution, concentrations and compositions of the organic solvent system, the period of time of immersing, or the external environment are adjusted such that the optical fibers is formed with high-particle-coated polymeric outer coating layers having desirable coating masses, coating thicknesses, or coating morphologies.

15 Claims, 17 Drawing Sheets

(58) Field of Classification Search
CPC ......... C03C 25/54; C08J 7/06; C08J 2333/12; C09D 1/00; C09D 7/61
See application file for complete search history.

(56) References Cited

U.S. PATENT DOCUMENTS

| | | | |
|---|---|---|---|
| 2004/0058087 A1* | 3/2004 | Baudin | C08F 2/50 427/493 |
| 2004/0264901 A1* | 12/2004 | Tao | G01N 21/7703 385/12 |
| 2008/0187655 A1* | 8/2008 | Markle | G01N 21/7703 427/372.2 |
| 2008/0308405 A1 | 12/2008 | Yu et al. | |
| 2008/0311345 A1* | 12/2008 | Ruuttu | C23C 14/0658 427/596 |
| 2014/0242710 A1* | 8/2014 | Suri | A61L 33/0023 436/95 |
| 2016/0169711 A1* | 6/2016 | Blakley | G01K 11/32 250/227.14 |

OTHER PUBLICATIONS

Ma, J. et al., "Fluorescent Porous Film Modified Polymer Optical Fiber via "Click" Chemistry: Stable Dye Dispersion and Trace Explosive Detection", ACS Applied Materials & Interfaces, 2015, 7:241-249, 2014 American Chemical Society.

Lin, L. et al., "Enhanced photocatalysis using side-glowing optical fibers coated with Fe-doped $TiO_2$ nanocomposite thin films", Journal of Photochemistry and Photobiology A: Chemistry, 2015, 307-308:88-98, Elsevier B.V.

* cited by examiner g-C₃N₄

TiO₂

Fe₂O₃

Al powder

METHOD FOR PREPARING OPTICAL FIBERS WITH HIGH-PARTICLE-COATED POROUS POLYMERIC OUTER COATING LAYERS

CROSS-REFERENCE TO RELATED APPLICATION

This application claims the benefit of U.S. Patent Application Ser. No. 62/973,354, filed Oct. 1, 2019, which is hereby incorporated by reference in its entirety including any tables, figures, or drawings.

BACKGROUND OF THE INVENTION

Photosensitive particles are particles exhibit active behaviors under light irradiation. Photocatalysts are one kind of photosensitive particles that can be applied in many different fields, including but not limited to production of hydrogen gas, degradation of pollutants in water or air, and disinfection of micro-organisms.

Photocatalyst particles need to be fixed on supporting materials to extend its applications in different fields. Lin et al. (2015) reported a polymer assisted hydrothermal deposition method (PAHD), in which a $TiO_2$- or $Fe/TiO_2$-coating layer is formed on the fiber surface by controlling stoichiometric ratio of precursor solutions, polymers and dopants for multi-phase materials. However, PAHD requires addition of high concentrations of $H_2O_2$ which is an explosive, polymers, and other chemicals, and the operation of the process is carried out at high temperature (for example, 180-200° C.) and at high pressure using a hydrothermal method. In addition, the process is a batch process which is difficult to be shifted to a continuous mode, and thus difficult to be scaled up.

Baba et al. (2017) proposed an atmospheric pressure plasma process to deposit $TiO_2$ thin films at a low temperature on polymer optical fibers (POFs). The atmospheric-pressure and low-temperature deposition of photocatalytic anatase $TiO_2$ coatings on POFs relies on the use of a microwave (MW) plasma discharge fed with argon and generated in a quartz tube through a surfatron device. The selected atmospheric-pressure MW plasma discharge provides a surface discharge inducing a high degree of ionization and high electron density on the inner surface of the quartz tube. In contrast, the central part of the tube is far less reactive, with temperatures compatible with the use of polymer substrates. Thus, POFs were introduced and passed without alteration in the central zone of the quartz tube. Subsequently, the POFs were coated with a whitish coating by injecting a $TiO_2$ precursor, i.e., TEOT, which is carried to the post discharge zone using a pure argon stream. Such process is difficult to control, requiring high energy and chemical cost. The formed $TiO_2$ is limited to certain morphologies and is difficult to control. More importantly, the formation of the photocatalyst on the fiber surface requires a significant amount of time, which is unfavourable for mass production.

Another conventional preparation method of particle coated optical fibers involves stripping off the polymeric outer coating layers of the optical fibers, dipping the optical fiber cores into particle suspensions, and drying the dipped optical fibers in an oven. Yu et al. (2007) filed a patent application "optical fiber photocatalytic reactor and process for the decomposition of nitrogen oxide using said reactor", describing a dip coating process. Before coating, pre-treatment was performed to remove original polymeric protection film off the optical fiber surface. Then, a three-step process of dipping, air-drying, and heat treatment was performed to coat photocatalysts on the quartz optical fibers. The coating of $TiO_2$ particles to the quartz optical fiber was primarily due to the electrostatic interactions between $TiO_2$ and quartz. As a result, the method was limited by the charge of the materials to be coated and the coating may not be firm. The process not only produces waste, but also requires multiple steps, and is thus complicated and time-consuming. The particles coated on the optical fibers form dense and non-porous layers, decreasing the mass transfer and reducing the numbers of reactive sites.

BRIEF SUMMARY OF THE INVENTION

There continues to be a need in the art for improved designs and techniques for fabrication of particle coated optical fibers.

Embodiments of the subject invention pertain to preparation of optical fibers formed with high-particle-coated porous polymeric outer coating layer.

According to an embodiment of the invention, a method for preparing optical fibers formed with high-particle-coated porous polymeric outer coating layer is provided. The method can comprise preparing a coating suspension solution by dispersing a plurality of particles into an organic solvent system, immersing one or more optical fibers into the coating suspension solution to form high-particle-coated porous polymeric outer coating layer, and removing the one or more optical fibers from the coating suspension solution to be dried. The concentrations and compositions of the particles in the coating suspension solution, the concentrations and compositions of the organic solvent system, the period of time of immersing, or the external environment can be adjusted such that the optical fibers is formed with high-particle-coated polymeric outer coating layers having desirable coating masses, coating thicknesses, or coating morphologies. The high-particle-coated polymeric outer coating layers are formed with porous structures providing reactive sites. Moreover, the optical fibers formed with high-particle-coated porous polymeric outer coating layer comprising are configured to perform, including but not limited to, degradation of methylene blue (MB) and activation of chlorine to degrade carbamazepine. Reactivity of $g$-$C_3N_4$-coated polymer optical fibers ($g$-$C_3N_4$-POFs) remains approximately same after multiple consecutive cycles of MB degradation and chlorine activation in degrading carbamazepine. The one or more optical fibers include but not limited to polyvinylidene difluoride (PVDF) coated optical fibers and one example of the organic solvent system is acetone. The one or more optical fibers each comprises inner optical fiber core made of, but not limited to, poly (methyl methacrylate) (PMMA), quartz, or glass; and the plurality of particles comprises, but not limited to, photocatalysts. Further, concentrations and compositions of particles of the coating suspension solution, solvent concentrations and compositions of the coating suspension solution, a period of time of immersing, or the external environment are adjusted to obtain desirable mass of particles coated on the optical fibers. The plurality of particles may comprise, but not limited to, $g$-$C_3N_4$ particles, $TiO_2$ particles, $Fe_2O_3$ particles, or Al particles. The plurality of particles can comprise one or more types of particles.

BRIEF DESCRIPTION OF THE DRAWINGS

FIGS. 3A-3D show images of PMMA optical fibers coated with different types of particles, wherein FIG. 3A shows an image of the PMMA optical fibers coated with g-$C_3N_4$ particles, wherein FIG. 3B shows an image of the PMMA optical fibers coated with $TiO_2$ particles, wherein FIG. 3C shows an image of the PMMA optical fibers coated with $Fe_2O_3$ particles, and wherein FIG. 3D shows an image of the PMMA optical fibers coated with Al powder, according to an embodiment of the subject invention.

FIGS. 9A-9C show images of different operating stages for the application of 0.07 mg/cm-18 cm g-$C_3N_4$-POFs for inhibiting the growth of algae in water, wherein FIG. 9A shows an image at the very beginning of the treatment, wherein FIG. 9B shows an image during of the treatment, and wherein FIG. 9C shows an image after the treatment.

DETAILED DISCLOSURE OF THE INVENTION

Embodiments of the subject invention provide novel and advantageous methods for preparing optical fibers with high-particle-coated porous polymeric outer coating layers.

According to embodiments of the subject invention, particles suspended in a solvent system are coated on the polymeric outer coating layers of optical fibers. By controlling concentrations and compositions of the particle suspension, concentrations and compositions of the solvent system, the period of time of immersing, and the external environment, optical fibers with high-particle-coated polymeric outer coating layers can be produced with different coating masses, coating thicknesses and coating morphologies. The method can be additionally configured to coat different types of particles onto optical fibers.

Moreover, the high-particle-coated polymeric outer coating layers obtained by the methods of the subject invention offer porous structures, allowing the fabricated optical fibers to have more reactive sites than those obtained by the conventional method in which, for example, the particle coated optical fibers are prepared by stripping off the polymeric outer coating layers, dipping the optical fiber cores into particle suspensions, and drying in an oven.

In one embodiment, the optical fibers formed with high-g-$C_3N_4$-coated porous PVDF outer coating layers can perform degradation of MB. The photocatalytic degradation of the MB achieves much higher rate constants than these of photocatalytic slurry with an equivalent photocatalyst dosage. Further, the reactivity of g-$C_3N_4$-POFs remains about same during, for example, 10 consecutive MB degradation test cycles, indicating long-term stability of the g-$C_3N_4$-POFs.

When the term "about" is used herein, in conjunction with a numerical value, it is understood that the value can be in a range of 90% of the value to 110% of the value, i.e. the value can be +/−10% of the stated value. For example, "about 1 kg" means from 0.90 kg to 1.1 kg.

Figure 1:
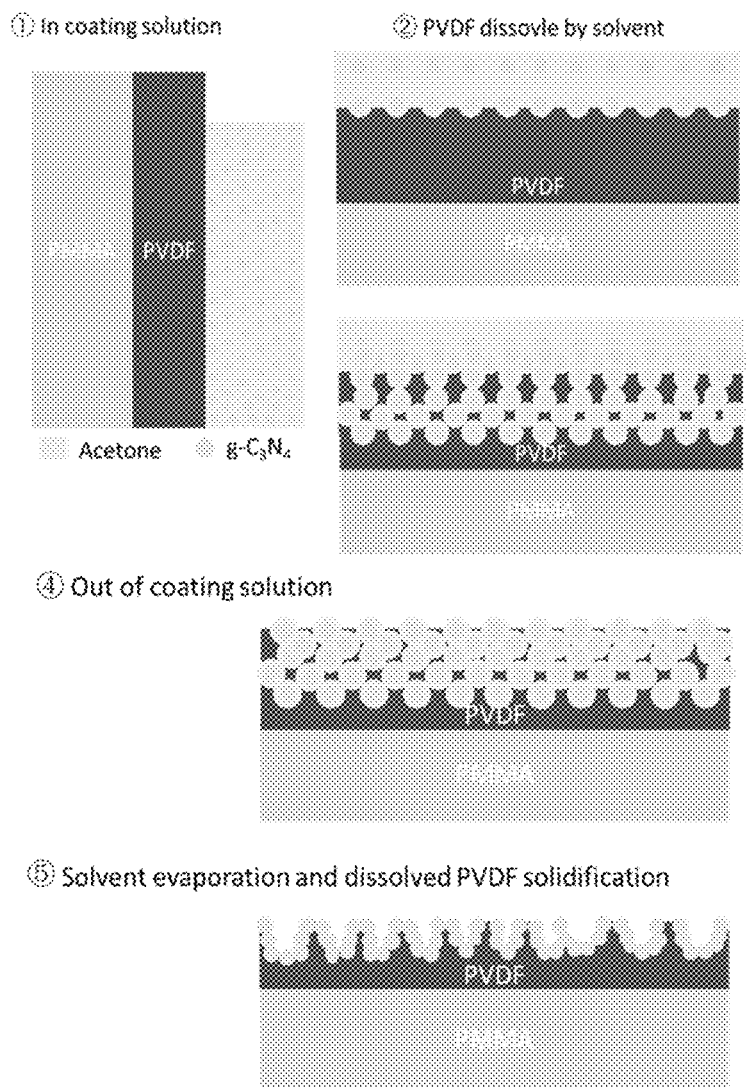
FIG. 1 is a schematic representation of the mechanism of the solvent-driven phase transitional dip coating method during the fabrication of the optical fibers with high-particle-coated porous polymeric outer coating layers, according to an embodiment of the subject invention.

FIG. 1 shows schematic diagrams of the mechanism of the method of the subject invention, which uses a solvent system, for example comprising 100% acetone, to slowly dissolve the polymeric outer coating layers of pre-fabricated optical fibers, for example, commercially available polyvinylidene difluoride (PVDF) coated optical fibers, while having the minimum impact on the inner optical fiber core, for example PMMA, quartz or glass. The particles, for example photocatalysts, suspended in the solvent system can thus diffuse into the dissolved polymeric outer coating layers. When the optical fibers are taken out from the suspension, the solvent diffused into the outer polymeric coating layer surface quickly evaporates and produces optical fibers with high-particle-coated porous polymeric outer coating layers.

Referring to FIG. 1, in one embodiment, the organic solvent system of the coating suspension solution may be acetone for coating the particles onto the optic fibers. The solvent system can comprise different solvents of different volumetric/mass ratios. The solvent system slowly dissolves the polymeric outer coating layers of the optical fibers, for example, commercially available PVDF coated optical fibers, while having minimum impacts on the inner core of the optical fibers which may be made of, for example, PMMA, quartz or glass.

Referring to FIG. 1 again, in another embodiment, the particles, for example photocatalysts, suspended in the solvent system can diffuse into the dissolved polymeric outer coating layers of the optical fibers. When the optical fibers are taken out of the coating suspension solution, the solvent diffused into the outer polymeric coating layer surface of the optical fibers quickly evaporates, resulting in optical fibers formed with high-particle-coated porous polymeric outer coating layers.

Figure 2A:
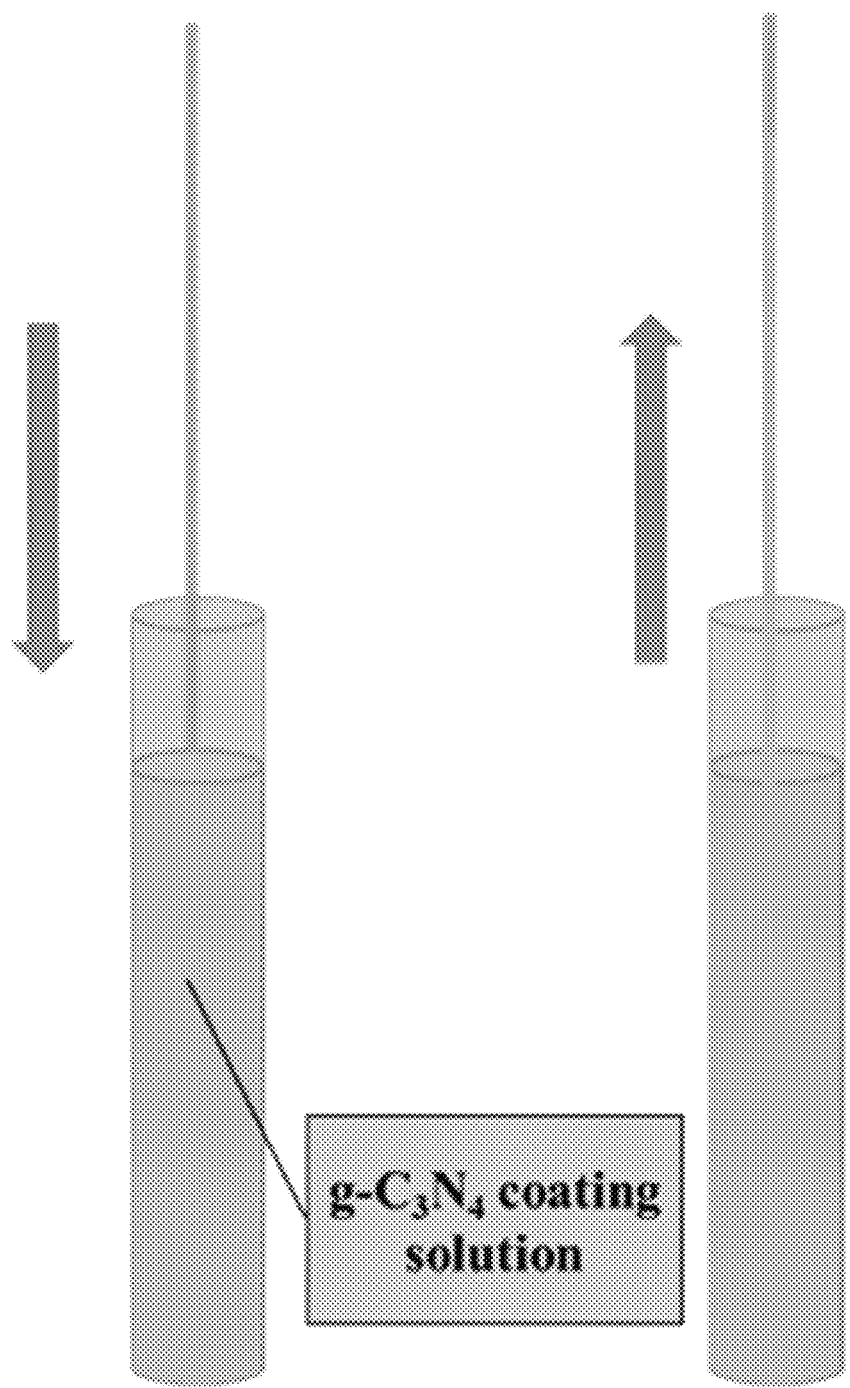
FIG. 2A is a schematic representation of a batch dip-coating system for producing optical fibers formed with high-particle-coated porous polymeric outer coating layers, according to an embodiment of the subject invention.
Figure 2B:
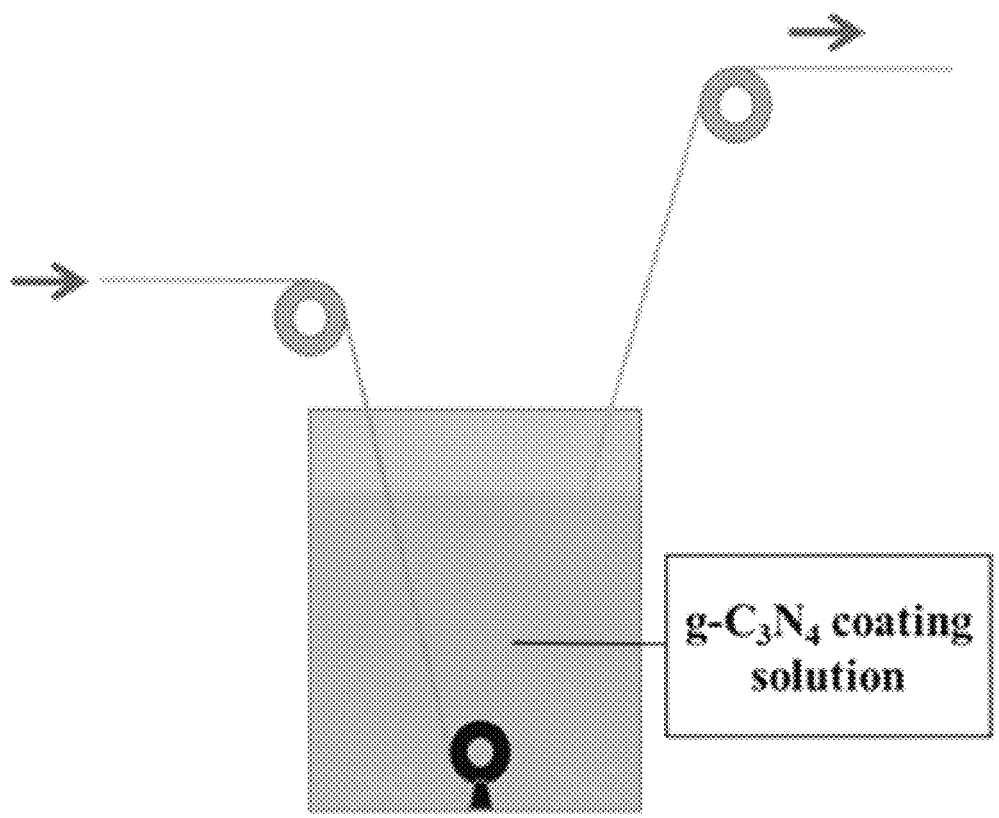
FIG. 2B is a schematic representation of a continuous dip-coating system for producing optical fibers formed with high-particle-coated porous polymeric outer coating layers, according to an embodiment of the subject invention.

FIGS. 2A-2B are schematic diagrams of the preparation methods of optical fibers formed with high-g-$C_3N_4$-coated porous PVDF outer coating layers. In particular, the batch coating method shown in FIG. 2A can be configured to prepare short optical fibers (for example, optical fiber having a length <10 cm), while the continuous coating method shown in FIG. 2B can be configured to prepare long optical fibers (for example, optical fiber having a length ≥10 cm).

Referring to FIG. 2A, in one embodiment, one or more optical fibers, for example, commercially available PVDF coated optical fibers are dipped into a preparation container containing a certain volume of coating suspension solution prepared by dispersing a plurality of particles into an organic solvent system. After a predetermined period of time, the optical fibers are removed from the container to be dried in air or at an elevated temperature created by, for example, an oven.

Referring to FIG. 2B, in another embodiment, one or more optical fibers, for example, commercially available PVDF coated optical fibers are continuously fed by a roller system into a preparation container containing a certain volume of coating suspension solution prepared by dispersing a plurality of particles in an organic solvent system. One example of the roller system comprises a first roller continuously receiving the one or more optical fibers and operably rotating the one or more optical fibers through the preparation container. After a predetermined period of time, the one or more optical fibers are removed from the container by a second roller of the roller system to be dried in air or at an elevated temperature created by, for example, an oven.

Furthermore, to improve the control of the entire process of the batch coating method or the continuous coating method, the preparation container may be provided with a pressure gauge and/or a thermometer (neither is shown in FIG. 2A or FIG. 2B) to monitor pressure variation and temperature inside the preparation container.

In one embodiment, the mass of particles coated on the optical fibers depends mainly on, but not limited to, the particle dosages of the coating suspension solution, the solvent concentrations and compositions of the organic solvent system, or the dip-coating contact times. Therefore, the methods of the subject invention are useful for coating different types of particles onto optical fibers with a polymeric outer coating layer soluble in an organic solvent system, regardless of the materials of the inner core of the optical fibers. The coated optical fibers prepared by the methods can be used in any applications where light activation or light stimulation of the particles coated on the optical fibers is required.

Figure 3A:
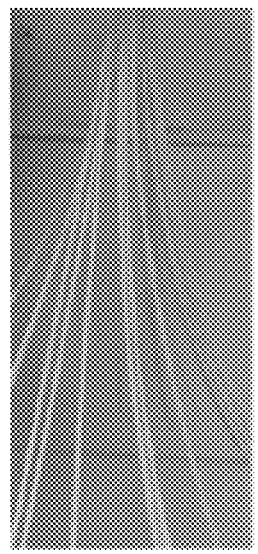
Figure 3B:
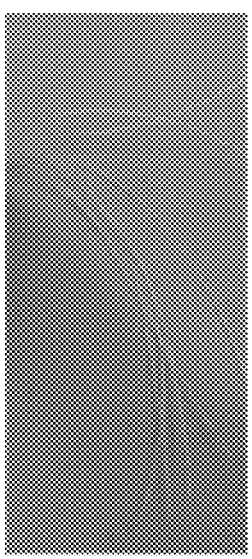
Figure 3C:
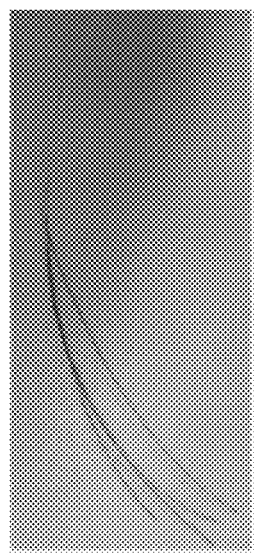
Figure 3D:
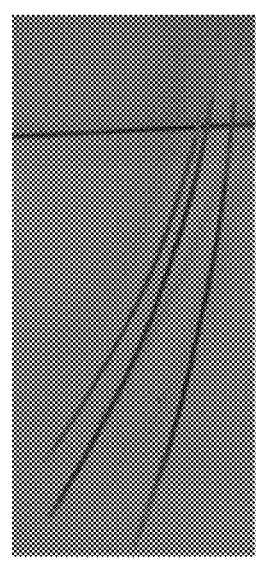

Referring to FIGS. 3A-3D, images of PMMA optical fibers coated with different types of particles are presented to indicate the versatility of the coating methods of the subject invention. In particular, FIG. 3A shows an image of PMMA optical fibers coated with g-$C_3N_4$ particles; FIG. 3B shows an image of PMMA optical fibers coated with $TiO_2$ particles; FIG. 3C shows an image of PMMA optical fibers coated with $Fe_2O_3$ particles, and FIG. 3D shows an image of PMMA optical fibers coated with Al powder.

Figure 4:
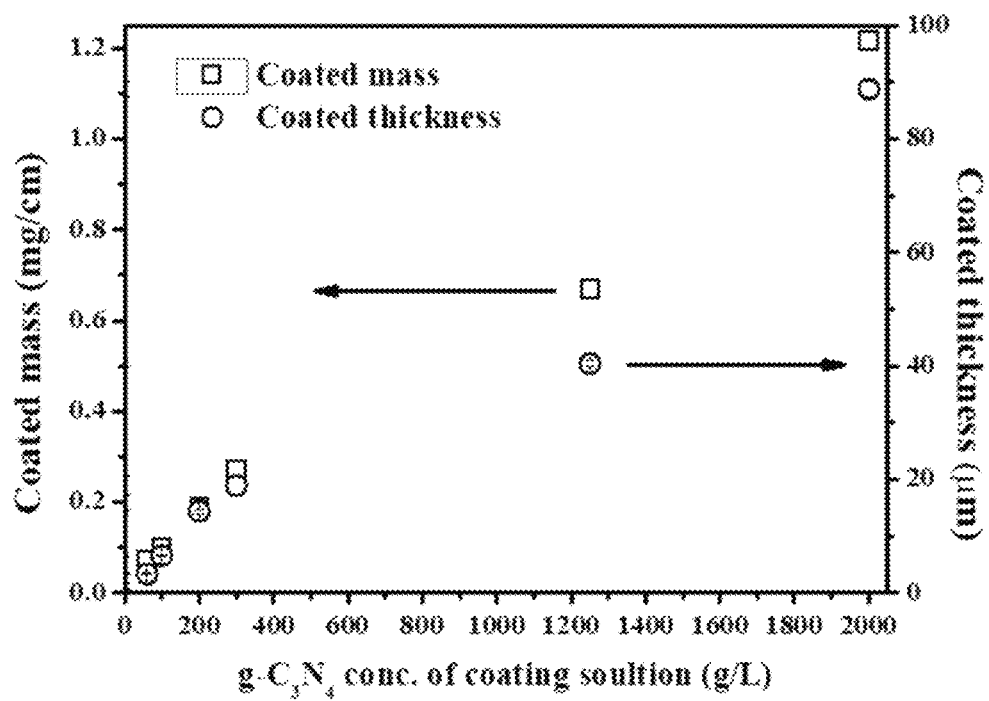
FIG. 4 is a plot diagram showing coating mass and coating thickness of g-$C_3N_4$-POFs as functions of g-$C_3N_4$ concentrations of the coating solutions, according to an embodiment of the subject invention.

FIG. 4 is a plot diagram showing the coating mass and coating thickness of the g-$C_3N_4$-POFs prepared by the methods of the subject invention as functions of concentrations of g-$C_3N_4$ of the coating suspension solutions. It is observed that both the coating mass and the coating thickness of the g-$C_3N_4$-POFs increase in an approximately linear relationship with increases of the g-$C_3N_4$ concentrations of the coating suspension solutions. The results suggest that the coating methods can be configured by controlling the concentrations of the g-$C_3N_4$ coating solutions such that the optical fibers can be formed with high-particle-coated polymeric outer coating layers having desirable coating masses, coating thicknesses, or coating morphologies.

Figure 5:
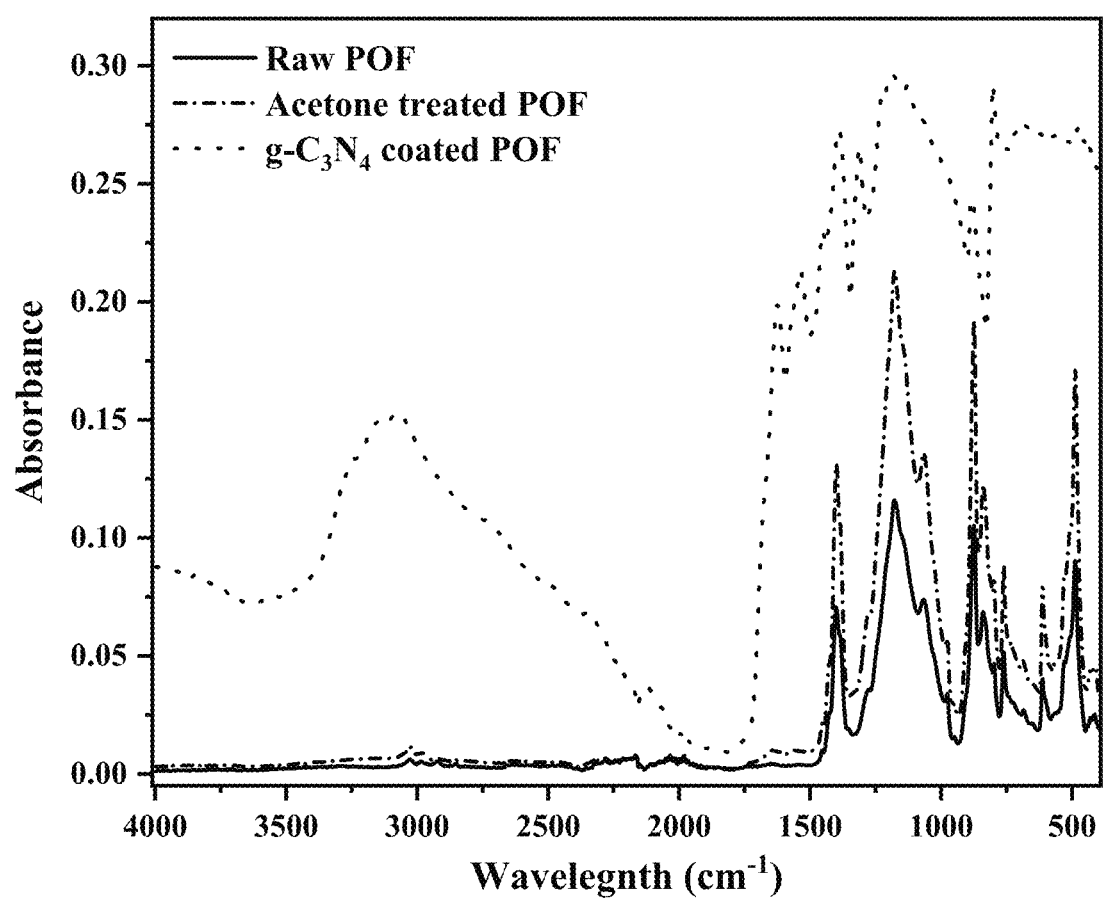
FIG. 5 is a plot diagram showing the FTIR spectrum of raw POF, acetone treated POF, and g-$C_3N_4$-POF, according to an embodiment of the subject invention.

FIG. 5 shows that the FTIR spectrum of raw POF, acetone treated POF, and g-$C_3N_4$-POF. Acetone treated POF share a similar FTIR spectrum with the raw POF, indicating acetone does not cause great damages to the POF structure. The FTIR spectrum of g-$C_3N_4$ coated POF is much different from these of the other two, indicating that the g-$C_3N_4$ is successfully coated onto fiber surface.

Figure 6A:
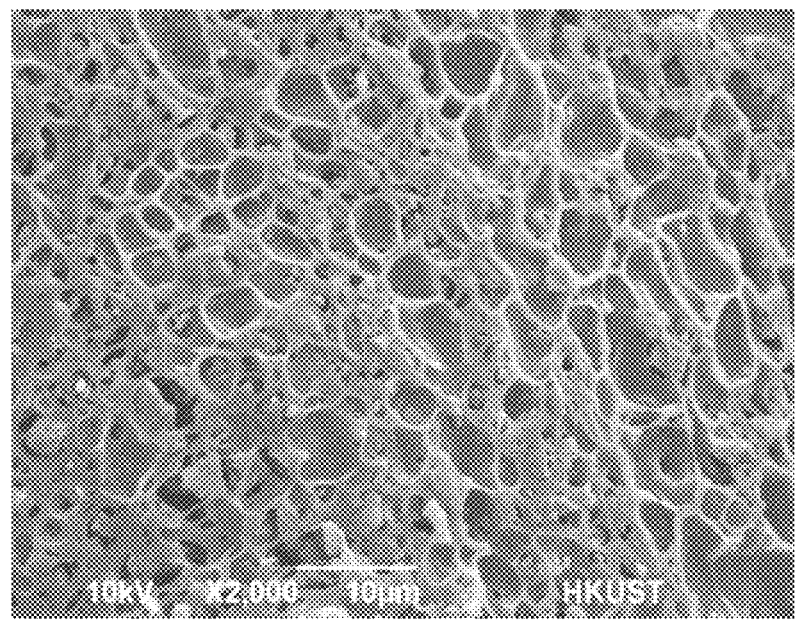
FIG. 6A is a SEM image showing surface morphologies of the 0.07 mg/cm-7 cm g-$C_3N_4$-POFs, according to an embodiment of the subject invention.
Figure 6B:
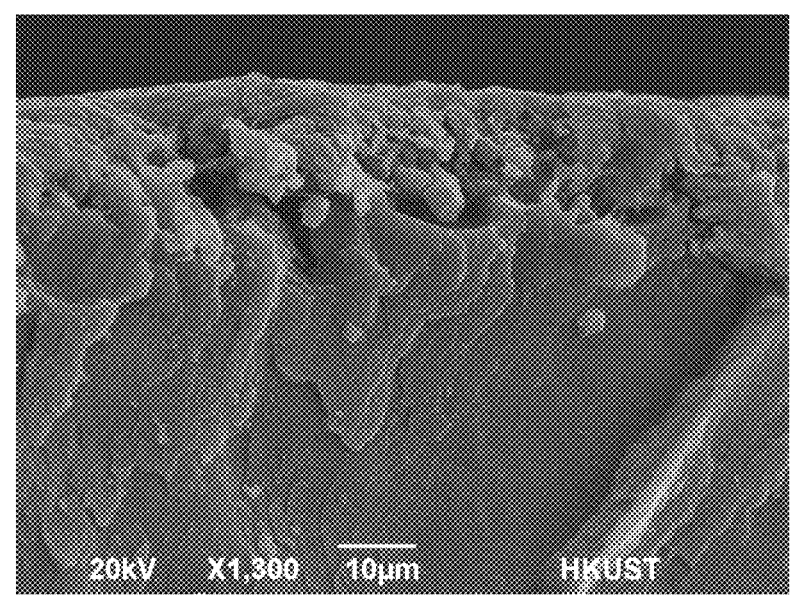
FIG. 6B is a cross-sectional SEM image showing morphologies of the 0.07 mg/cm-7 cm g-$C_3N_4$-POFs, according to an embodiment of the subject invention.

The SEM images of FIGS. 6A-6B illustrate the porous structures of the particles such as photocatalysts coated on the outer layer of the g-$C_3N_4$-POFs. In particular, g-$C_3N_4$ particles are embedded into the pores.

Figure 7:
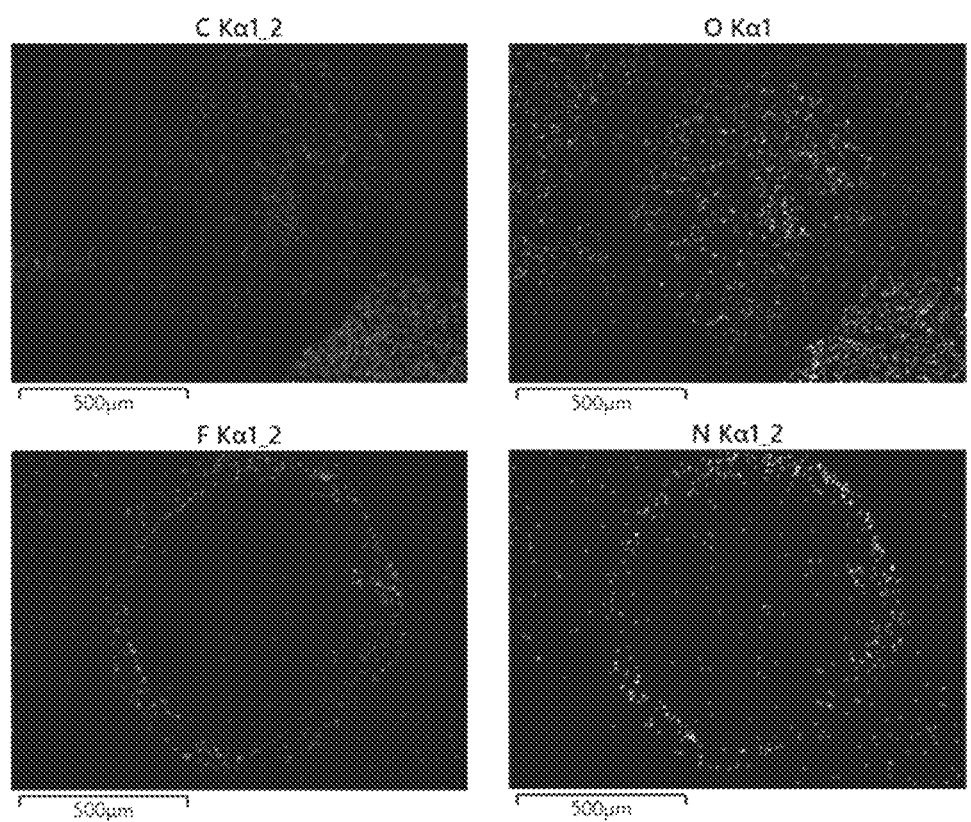
FIG. 7 is a cross-sectional SEM mapping images showing the distribution of C, O, F, and N elements, according to an embodiment of the subject invention.

The cross-sectional SEM mapping images of FIG. 7 show that the N and F elements on the outer layer of the g-$C_3N_4$-POFs are highly overlapped, indicating the integration of g-$C_3N_4$ into the PVDF out layer.

Figure 8A:
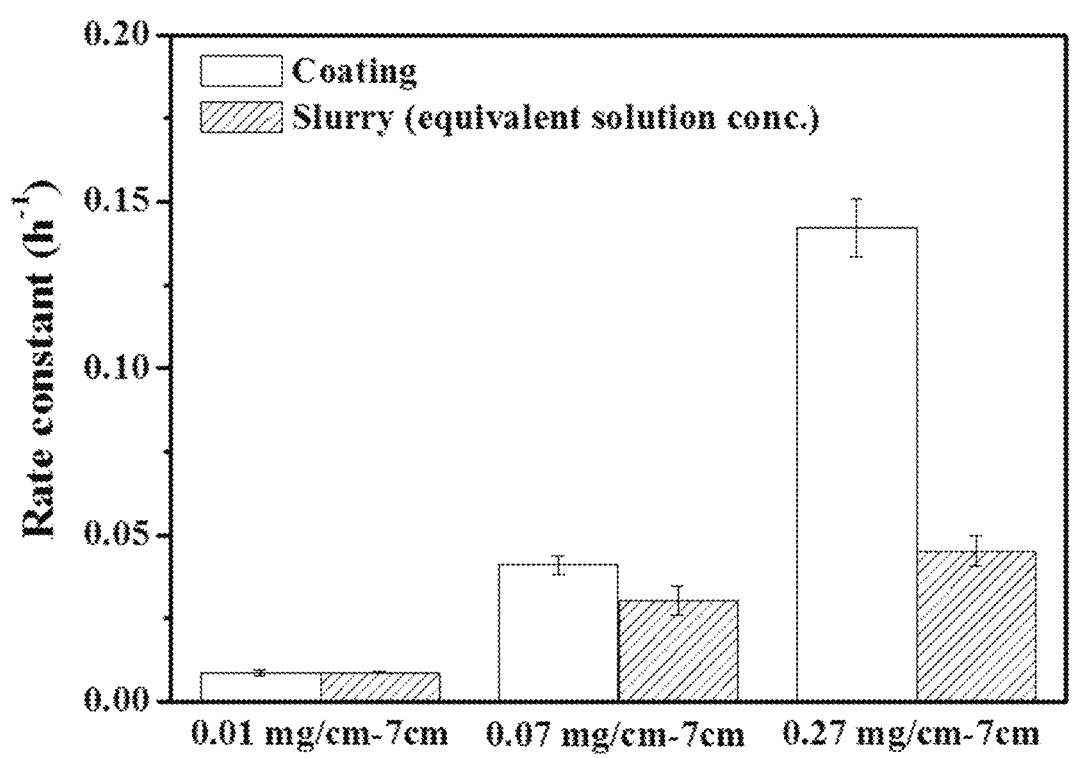
FIG. 8A is a bar chart showing degradation rate constants of MB by the g-$C_3N_4$-POFs with different coating masses, according to an embodiment of the subject invention.
Figure 8B:
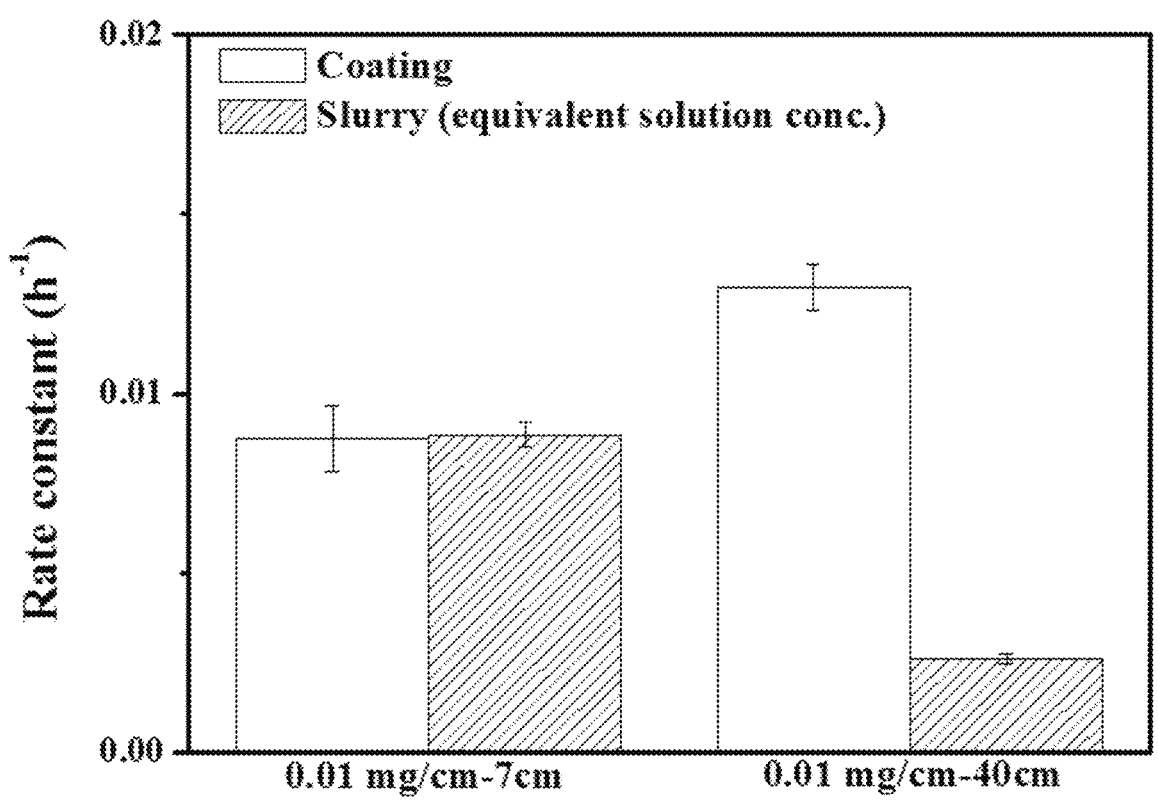
FIG. 8B is a bar chart showing degradation rate constants of MB by the g-$C_3N_4$-POFs with different coating lengths, according to an embodiment of the subject invention.

FIGS. 8A-8B are bar charts showing the degradation rate constants of MB degraded by g-$C_3N_4$-POFs formed with different coating masses and coating lengths. In particular, as shown in FIG. 8A, the degradation rate constant of MB by 0.01 mg/cm-7 cm g-$C_3N_4$-POFs is compared to that of g-$C_3N_4$ slurry with an equivalent g-$C_3N_4$ concentration. When the coating masses is increased from 0.01 mg/cm-7 cm to 0.07 mg/cm-7 cm and 0.27 mg/cm-7 cm, the degradation rate constant significantly increases from 0.008 $h^{-1}$ to 0.04 $h^{-1}$ and to 0.14 $h^{-1}$, respectively, which are more than 2 times and 3 times comparing with these of g-$C_3N_4$ slurry with equivalent g-$C_3N_4$ concentrations, respectively.

Moreover, FIG. 8B is the bar chart showing the degradation rate constants of MB degraded by g-$C_3N_4$-POFs of 0.01 mg/cm-7 cm and 0.01 mg/cm-40 cm. Although the degradation rate constants of MB are similar for 0.01 mg/cm-7 cm g-$C_3N_4$-POFs and g-$C_3N_4$ slurry, the degradation rate constant of MB degraded by 0.01 mg/cm-40 cm g-$C_3N_4$-POFs is much higher than that of g-$C_3N_4$ slurry with an equivalent g-$C_3N_4$ concentration. The results suggest that the g-$C_3N_4$-POFs can effectively overcome the issue of low light penetration depth, when the particles such as photocatalysts are used to degrade pollutants in an aquatic environment.

Figure 9A:
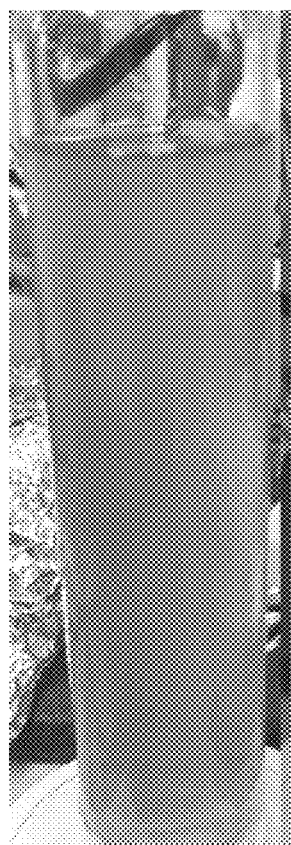
Figure 9B:
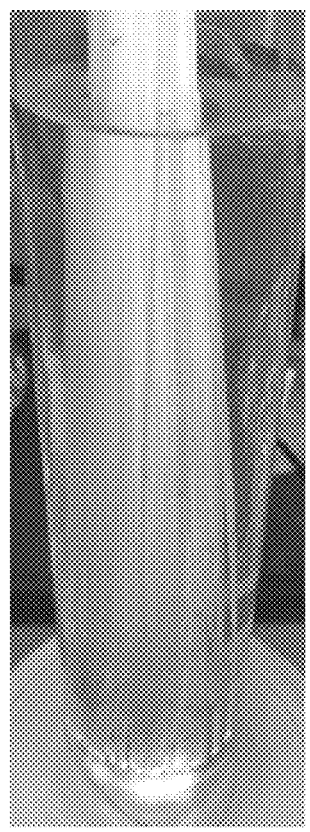
Figure 9C:
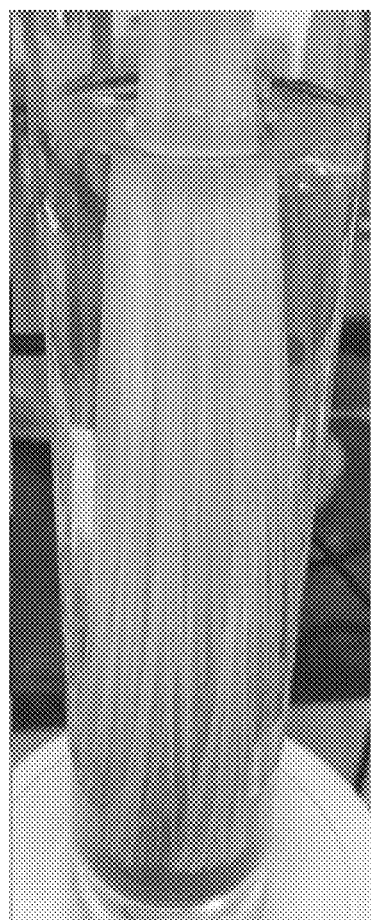

FIGS. 9A-9C are images showing the application of the long g-$C_3N_4$-POFs for inhibiting algae growth in water. The algae growth can be well controlled after the treatment by the g-$C_3N_4$-POFs.

Figure 10:
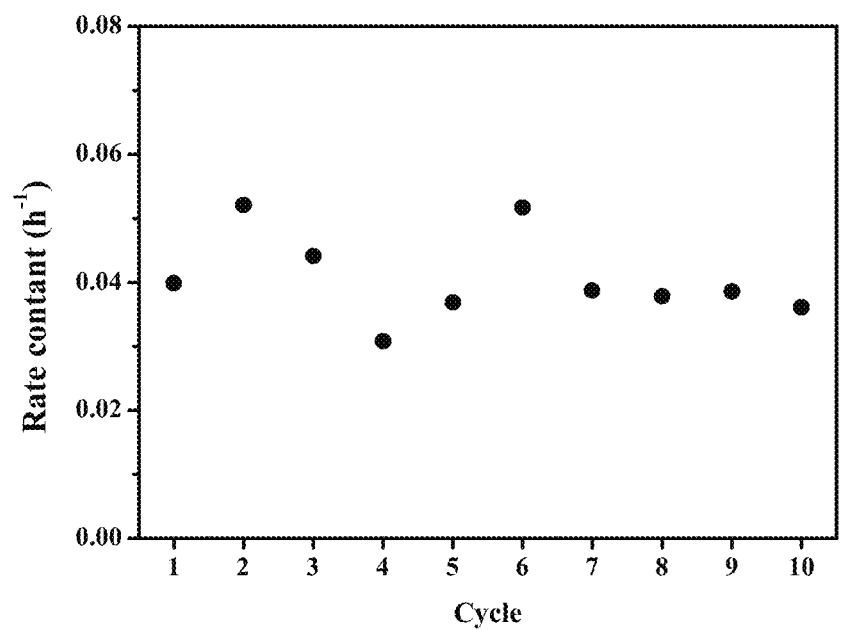
FIG. 10 is a plot diagram showing degradation rate constants of MB by the 0.07 mg/cm-7 cm g-$C_3N_4$-POFs during multiple test cycles, according to an embodiment of the subject invention.

FIG. 10 is a plot diagram showing the degradation rate constants of MB degraded by 0.07 mg/cm-7 cm g-$C_3N_4$-POFs during multiple test cycles. It is observed that the reactivity of the 0.07 mg/cm-7 cm g-$C_3N_4$-POFs remains almost same even after 10 consecutive MB degradation test cycles, indicating the long-term stability of the coated optical fibers.

Figure 11A:
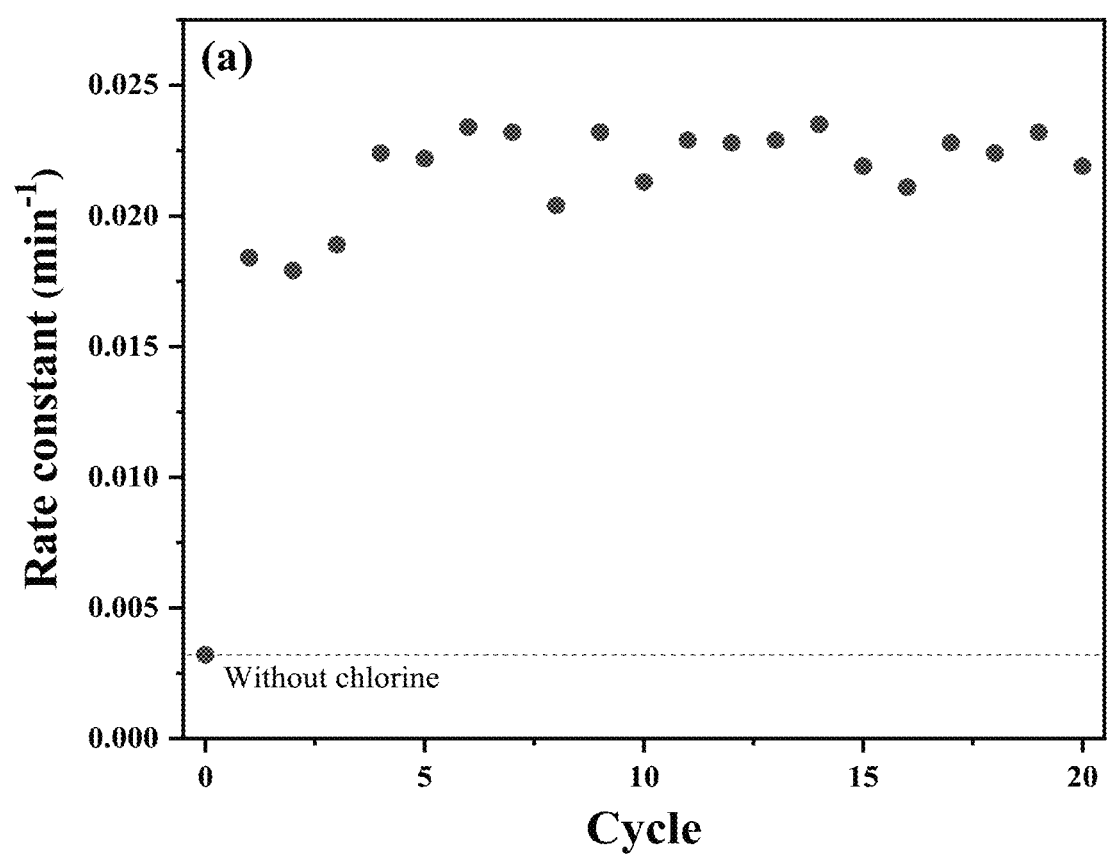
FIG. 11A is a plot diagram showing degradation rate constants of carbamazepine in pure water by the 0.2 mg/cm-7 cm g-$C_3N_4$-POFs with the addition of chlorine during multiple test cycles, according to an embodiment of the subject invention.
Figure 11B:
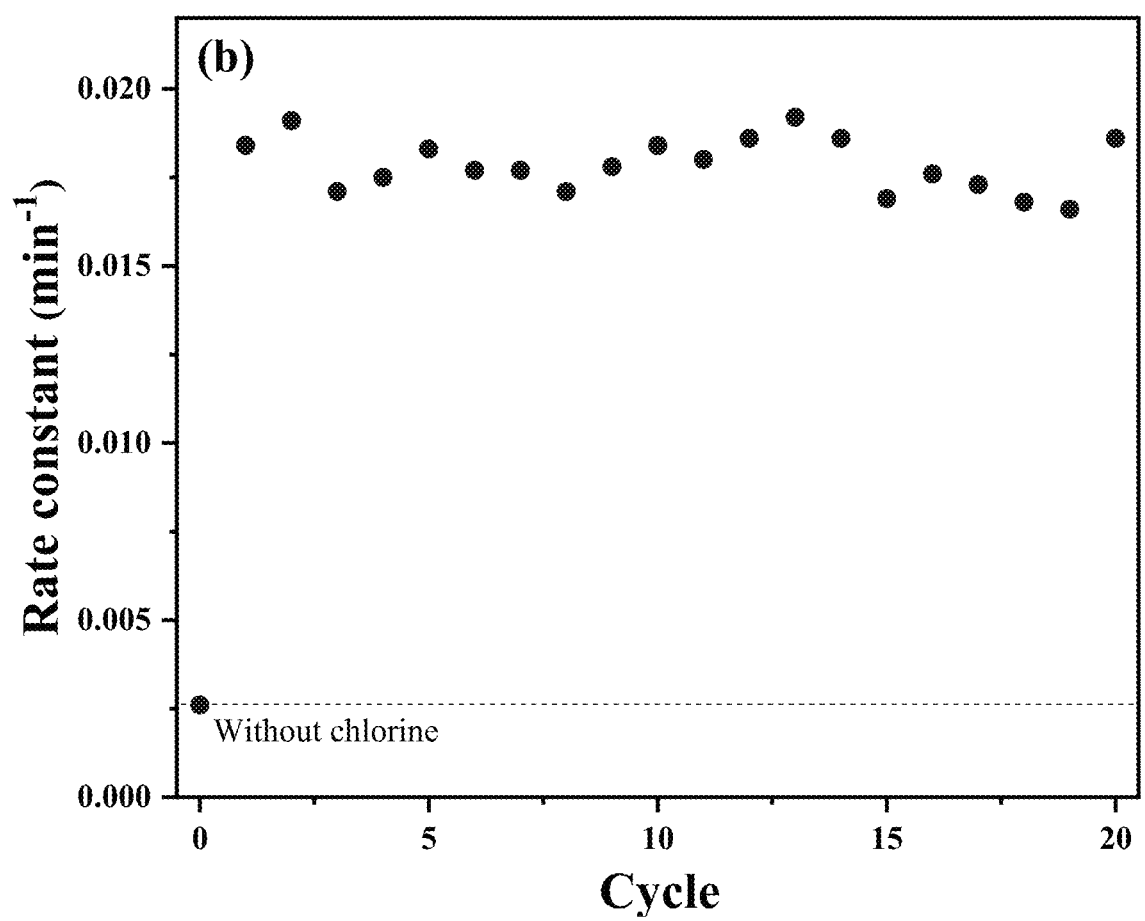
FIG. 11B is a plot diagram showing degradation rate constants of carbamazepine in simulated drinking water by the 0.2 mg/cm-7 cm g-$C_3N_4$-POFs with the addition of chlorine during multiple test cycles, according to an embodiment of the subject invention.

FIGS. 11A and 11B are plot diagrams showing the degradation rate constants of carbamazepine degraded by the 0.2 mg/cm-7 cm g-$C_3N_4$-POFs with the addition of chlorine in the pure and simulated drinking water during multiple test cycles, respectively. It is observed that the reactivity of the 0.2 mg/cm-7 cm g-$C_3N_4$-POFs remains about same even after 10 consecutive carbamazepine degradation test cycles under the two scenarios, indicating the long-term stability of the coated optical fibers both in the pure and simulated water in the presence of oxidant.

The embodiments of the subject invention provide methods for coating particles onto optical fibers having a polymeric outer coating layer soluble in a solvent system, regardless of the materials of the inner cores of the optical fibers. The high-particle-coated polymeric outer coating layers prepared by the method have porous structures, allowing the coated optical fibers to have significantly more reactive sites than the particle coated optical fibers prepared by the conventional technologies.

The methods of the subject invention do not require pretreatments, energy intensive calcination, hydrothermal process for forming the coated layer, or atmospheric-pressure MW plasma discharge and temperature compatible with the use of polymer substrates. Comparing to the conventional technologies such as the polymer assisted hydrothermal deposition method or the atmospheric pressure plasma method, the methods of the subject invention are less energy intensive, easy to operate, low-cost, and capable of forming stable coating layers.

Applications of the methods of the subject invention may include, but not limited to: (1) photocatalytic disinfection and organic pollutant degradation in water and in air, when photocatalysts are coated on the optical fibers; (2) decorative lighting in indoor and outdoor, when photoluminescent particles are coated on the optical fibers; and (3) organic synthesis.

For example, one potential application is in water treatment sector, where the coated optical fibers may be placed in drinking water storage tanks, water towers, or pipelines to safeguard the drinking water safety. In another example, the coated optical fibers may be placed in recreational waters to inhibit microbial/algae growth.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

Baba, K., Bulou, S., Choquet, P., Boscher, N. D., 2017. Photocatalytic anatase TiO2 thin films on polymer optical fiber using atmospheric-pressure plasma, 9, 15, 13733-13741.

Lin, L., Wang, H., Luo, H., Xu, P., 2015. Enhanced photocatalysis using side-glowing optical fibers coated with Fe-doped TiO2 nanocomposite thin films. Journal of Photochemistry and Photobiology A: Chemistry, 307-308, 88-98.

Yu, Y., Wu, J. C. S., Tsai, D. P., Huang, H. J., Chu, T. C., Lan, T. W., 2007. Optical fiber photocatalytic reactor and process for the decomposition of nitrogen oxide using said reactor. US Patent, US20080308405A1.

We claim:

1. A method for preparing optical fibers formed with high-particle-coated porous polymeric outer coating layers, the method comprising:
preparing a coating suspension solution by dispersing a plurality of particles into an organic solvent system;
immersing at least one optical fiber into the coating suspension solution for a period of time to form a high-particle-coated porous polymeric outer coating layer uniformly dispersed on an entire exterior surface of the at least one fiber that is in contact with the coating suspension solution while exposing an end of the at least one fiber immersed into the coating suspension solution to an outside of the at least one fiber; and
removing the one or more optical fibers from the coating suspension solution to be dried.

2. The method of claim 1, wherein concentrations and compositions of the particles in the coating suspension solution, concentrations and compositions of the organic solvent system, the period of time of immersing, or conditions of the external environment are adjusted such that each optical fiber is formed with a high-particle-coated polymeric outer coating layer having desirable coating masses, coating thicknesses, or coating morphologies.

3. The method of claim 1, wherein the high-particle-coated polymeric outer coating layer is formed with a porous structure providing reactive sites.

4. The method of claim 1, wherein the optical fibers formed with high-particle-coated porous polymeric outer coating layers are configured to perform degradation of methylene blue (MB) and activation of chlorine.

5. The method of claim 4, wherein reactivity of g-$C_3N_4$-POFs remains approximately same after multiple consecutive cycles of MB degradation and chlorine activation.

6. The method of claim 1, wherein the one or more optical fibers comprises polyvinylidene difluoride (PVDF) coated optical fibers.

7. The method of claim 1, wherein the organic solvent system comprises acetone.

8. The method of claim 1, wherein the one or more optical fibers each comprises an inner optical fiber core made of poly(methyl methacrylate) (PMMA), quartz, or glass.

9. The method of claim 1, wherein the plurality of particles comprises photocatalysts.

10. The method of claim 1, wherein concentrations and compositions of particles of the coating suspension solution, concentrations and compositions of the solvent system of the coating suspension solution, the period of time of immersing, or conditions of the external environment are adjusted to obtain a desirable mass of particles coated on the optical fibers.

11. The method of claim 1, wherein the plurality of particles comprises g-$C_3N_4$ particles.

12. The method of claim 1, wherein the plurality of particles comprises $TiO_2$ particles.

13. The method of claim 1, wherein the plurality of particles comprises $Fe_2O_3$ particles.

14. The method of claim 1, wherein the plurality of particles comprises Al particles.

15. The method of claim 1, wherein the plurality of particles comprises one or more types of particles.

* * * * *